(12) United States Patent
Jacobson

(10) Patent No.: US 6,702,083 B2
(45) Date of Patent: Mar. 9, 2004

(54) PRESSURE ACTUATED CLUTCH PULLEY

(75) Inventor: Richard Jacobson, Ann Arbor, MI (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/187,813

(22) Filed: Jul. 2, 2002

(65) Prior Publication Data

US 2004/0003978 A1 Jan. 8, 2004

(51) Int. Cl.[7] .......................................... F16D 25/0635
(52) U.S. Cl. ................................. 192/85 A; 192/89.29
(58) Field of Search ........................... 192/89.29, 88 A, 192/85 A, 85 V; 474/171, 158

(56) References Cited

U.S. PATENT DOCUMENTS

| | | | | |
|---|---|---|---|---|
| RE24,157 E | * | 5/1956 | Johnson ..................... | 192/88 A |
| 2,858,920 A | * | 11/1958 | Doble ....................... | 192/89.29 |
| 3,189,151 A | | 6/1965 | Sullivan | |
| 3,540,560 A | * | 11/1970 | Damico ..................... | 192/88 A |
| 3,782,516 A | * | 1/1974 | Frisby et al. .............. | 192/88 A |
| 3,789,965 A | | 2/1974 | Heidorn | |
| 4,391,356 A | * | 7/1983 | Takemura et al. ........ | 192/89.29 |
| RE31,361 E | * | 8/1983 | Smirl ........................... | 477/39 |
| 4,483,428 A | * | 11/1984 | Sudbeck et al. ........... | 192/85 V |
| 4,708,229 A | * | 11/1987 | Anderson et al. ......... | 192/88 A |
| 5,377,799 A | * | 1/1995 | Mullaney .................. | 192/89.29 |

* cited by examiner

Primary Examiner—Rodney H. Bonck
(74) Attorney, Agent, or Firm—Brinks Hofer Gilson & Lione

(57) ABSTRACT

A pressure actuated clutch pulley rotationally engaging an input device and an output shaft, including a sheave member, a hub member, a plate member, and a clutch. The sheave member includes a sheave input section adapted to engage the input device and a sheave structural section extending radially inward. The hub member includes a hub output section adapted to engage the output shaft. The plate member includes a plate outer edge mounted to the sheave input section and a plate inner edge located radially inward from the plate outer edge. The sheave member, the hub member, and the plate member cooperatively define a cavity. The plate inner edge is selectively movable between two axial position based upon a pressure within the cavity. The clutch is adapted to selectively rotationally engage the plate member and the hub member based upon the axial position of the plate inner edge.

20 Claims, 4 Drawing Sheets

PRESSURE ACTUATED CLUTCH PULLEY

BACKGROUND

Many conventional motor vehicles include engine controls and vacuum motors that are operated by a vacuum pressure supplied by an internal combustion engine. After cold-starting the engine, there is not adequate vacuum pressure to operate these devices. In these situations, especially with a diesel engine that has no vacuum source, there is typically a need to operate a vacuum pump for a short period. Ideally, the vacuum pump would be selectively coupled to the engine, such that insufficient vacuum pressure would couple the engine output to the vacuum pump and sufficient vacuum pressure would uncouple the engine output from the vacuum pump. Although this need could be filled by conventional pressure actuated clutch pulleys, these clutch pulleys are designed to transfer a larger amount of torque and are typically designed with splines or keys, which burden the clutch pulley with unnecessary weight and expense. Thus, there is a need in the art of motor vehicles, if not other arts, for a pressure actuated clutch pulley that is lighter and cheaper than the conventional clutch pulleys.

DESCRIPTION OF THE PREFERRED EMBODIMENTS

The following description of the preferred embodiments of the invention is not intended to limit the scope of this invention to these preferred embodiments, but rather to enable any person skilled in the art of pressure actuated clutch pulleys to make and use this invention.

Figure 1:
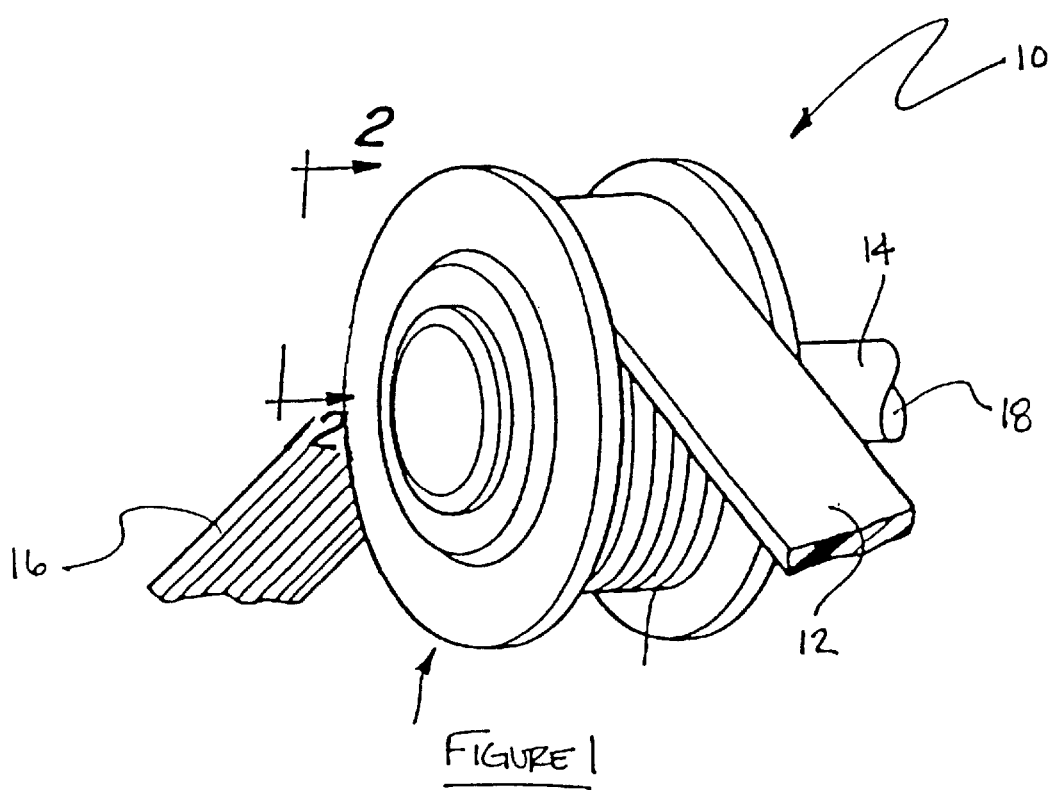
FIG. 1 is a perspective view of a pressure actuated clutch pulley of the invention, shown with a drive belt as the input device and a cylindrical shaft as the output device.

As shown in FIG. 1, the invention includes a pressure actuated clutch pulley 10 for rotationally engaging an input device 12 and an output shaft 14. The clutch pulley 10 has been designed for use with a drive belt 16 as the input device 12, and with a cylindrical shaft 18 of a vacuum pump (not shown) as the output shaft 14. The clutch pulley 10 may be used, however, in other environments, with other suitable input devices and with other suitable output shafts. Furthermore, the clutch pulley 10 may be used in an environment with two devices that alternate their rotational input responsibilities, and in an environment with an "output shaft" that actually provides rotational input and with an "input device" that actually receives rotational input. In these alternative embodiments, the terms "input" and "output" are interchangeable.

Figure 2A:
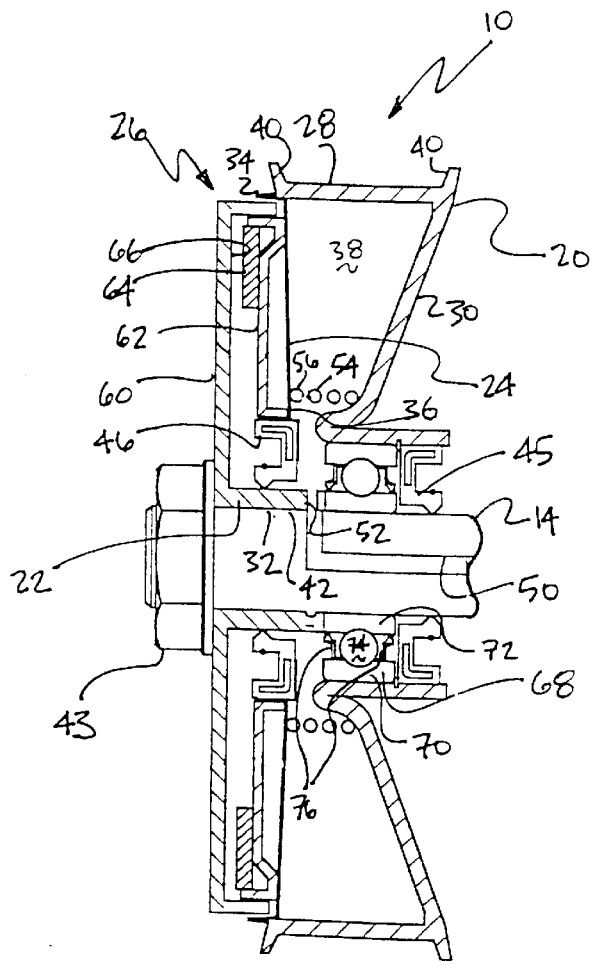
FIG. 2A is a partial cross-section view, taken along the line 2—2 of FIG. 1, of the pressure actuated clutch pulley of the invention, shown in a disengaged position.

As shown in FIG. 2A, the clutch pulley 10 of the preferred embodiment includes a sheave member 20, a hub member 22, a plate member 24, and a clutch 26. The sheave member 20 includes a sheave input section 28 adapted to engage the input device and a sheave structural section 30 extending radially inward. The hub member 22 includes a hub output section 32 adapted to engage the output shaft 14. The plate member 24 includes a plate outer edge 34 mounted to the sheave input section 28 and a plate inner edge 36 located radially inward from the plate outer edge 34. The sheave member 20, the hub member 22, and the plate member 24 cooperatively define a cavity 38. The plate inner edge 36 is selectively moveable between two axial positions based upon a pressure within the cavity 38. The clutch 26 is adapted to selectively rotationally engage the plate member 24 and the hub member 22 based upon the axial position of the plate inner edge 36. Because torque is transferred from the sheave member 20, through the plate member 24, through the clutch 26, into the hub member 22, without the use of splines or keys, the clutch pulley 10 of the invention may be made lighter and cheaper than the conventional clutch pulleys in the art.

The sheave input section 28 of the preferred embodiment functions to engage the drive belt. To substantially prevent rotational and axial slippage of the sheave member 20 and the drive belt, the sheave input section 28 preferable defines two sheave input shoulders 40. The sheave input section 28 may alternatively define other suitable surfaces, such as grooved surfaces, toothed surfaces, or ribbed surfaces to engage the input device. The sheave input section 28 is preferably outwardly directed (away from the rotational axis of the clutch pulley 10) and is preferably substantially cylindrically shaped. The sheave input section 28 is preferably made from conventional structural materials, such as steel, but may alternative be made from other suitable materials.

The sheave structural section 30 of the preferred embodiment functions to help define the cavity 38 and to help mount the sheave member 20 on the output shaft 14. The sheave structural section 30 preferably extends radially inward from the sheave input section 28, while preferably slanting axially outward toward the clutch 26. The sheave structural section 30 also preferably double-backs and extends axially outward from the clutch 26. The sheave structural section 30 is preferably integrally formed with the sheave input section 28, but may alternatively be formed separately from the sheave input section 28 and later mounted to the sheave input section 28. The sheave structural section 30 is preferably made from conventional structural materials, such as steel, but may alternatively be made from other suitable materials.

The hub output section 32 of the preferred embodiment functions to engage the output shaft 14. The hub output section 32 preferably defines a smooth surface 42, which allows easy centering of the clutch pulley 10 onto the output shaft 14. The clutch pulley 10 preferably uses a nut 43 to engage the output shaft 14. The hub output section 32 may alternatively define a threaded surface, a hexagonal surface, a splined surface, or any other suitable surface that allows engagement between the hub output section 32 and the output shaft 14. The hub output section 32 is preferably inwardly directed (toward the rotational axis of the clutch pulley 10) and is preferably substantially cylindrically shaped. The hub output section 32 is preferably made from conventional structural materials, such as steel, but may alternatively be made from other suitable materials.

Figure 2B:
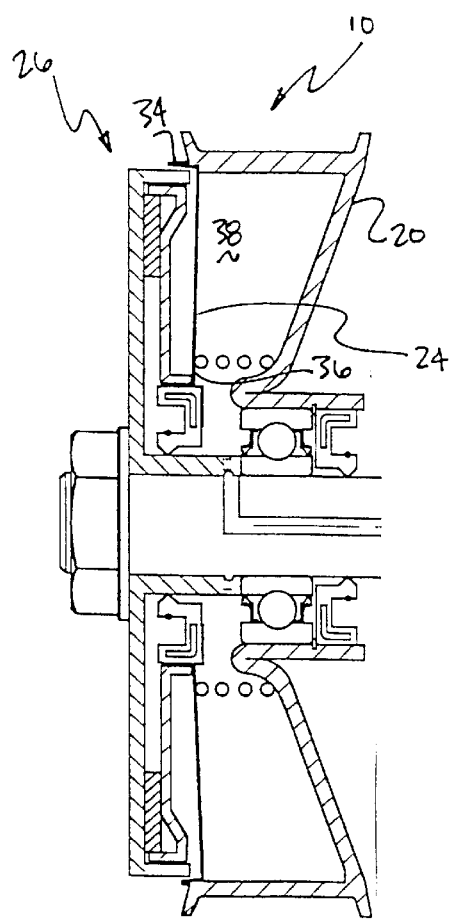
FIG. 2B is a partial cross-section view, taken along the line 2—2 of FIG. 1, of the pressure actuated clutch pulley of the invention, shown in an engaged position.
Figure 4:
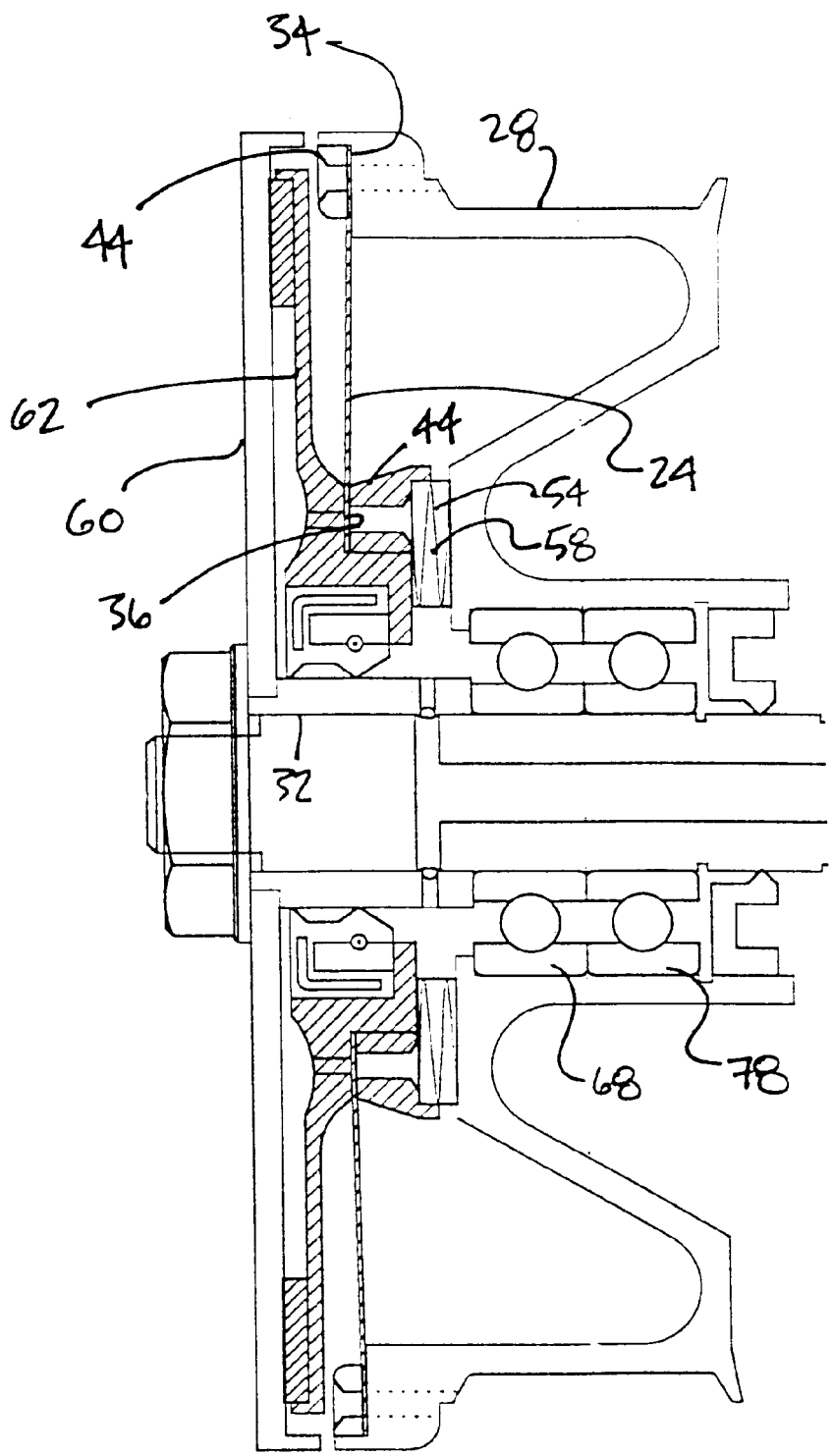
FIG. 4 is a partial cross-section view similar to FIGS. 2A and 2B, of the pressure actuated clutch pulley of the invention, shown with several alternative aspects of the invention.

The plate member 24 of the preferred embodiment functions to selectively engage the clutch 26 based upon a pressure within the cavity 38 and to transfer torque from the sheave member 20 to the clutch 26. The plate outer edge 34 of the plate member 24 is preferably crimped to the sheave input section 28, but may alternatively be mounted to the sheave input section 28 with other suitable fasteners, such as bolts 44 (as shown in FIG. 4). The plate inner edge 36, which is located radially inward from the plate outer edge 34, is selectively moveable between a first axial position, as shown in FIG. 2A, and a second axial position, as shown in FIG. 2B, based upon a pressure within the cavity 38. The plate member 24 is preferably a bistable compliant mechanism. A conventional bistable compliant mechanism, such as a light switch, experiences an instable equilibrium during a deflection within a motion range and experiences a stable equilibrium in two discrete positions. The plate member 24, likewise, preferably experiences an instable equilibrium during a deflection of the plate outer edge 34 relative to the plate inner edge 36 and experiences a stable equilibrium in the first axial position (shown in FIG. 2A) and in the second axial position (shown in FIG. 2B). The plate member 24 also preferably experiences a hysteresis affect. The hysteresis, which may be designed for the particular application of the clutch pulley, reduces the activation cycles of the vacuum pump. The plate member 24 is preferably made from conventional structural materials, such as aluminum or tin, but may alternatively be made from other suitable materials that allow significant torque transfer from the sheave member 20 to the clutch 26 and allow significant axial displacement of the plate inner edge 36 based upon a pressure within the cavity 38.

As shown in FIG. 2A, the cavity 38 of the preferred embodiment is preferably cooperatively defined by the sheave member 20, the hub member 22, and the plate member 24. The preferred embodiment also uses a sheave seal 45 and a plate seal 46 to define the cavity 38. The sheave seal 45 is preferably fastened to the sheave structural section 30 and is adapted to substantially seal against the output shaft 14, while the plate seal 46 is preferably fastened to the plate inner edge 36 and is adapted to substantially seal against the hub member 22. The sheave seal 45 and the plate seal 46 are preferably conventional devices that may alternatively be any suitable sealing device. The clutch pulley 10 of the preferred embodiment also uses a portion of the output shaft 14 to define the cavity 38. In alternative embodiments, other suitable elements may be used to cooperatively define the cavity 38.

The clutch pulley 10 is preferably used with an output shaft 14 defining a conduit 50 that allows modification of the pressure within the cavity 38. The conduit 50 is preferably connected to a vacuum source (not shown). The hub member 22 preferably defines a port 52 adapted to allow fluid flow between the cavity 38 and the conduit 50. By regulating the fluid flow from the vacuum source through the conduit 50 of the output shaft 14, through the port 52 of the hub member 22, and into and out of the cavity 38, the pressure within the cavity 38 can be easily altered.

Figure 3:
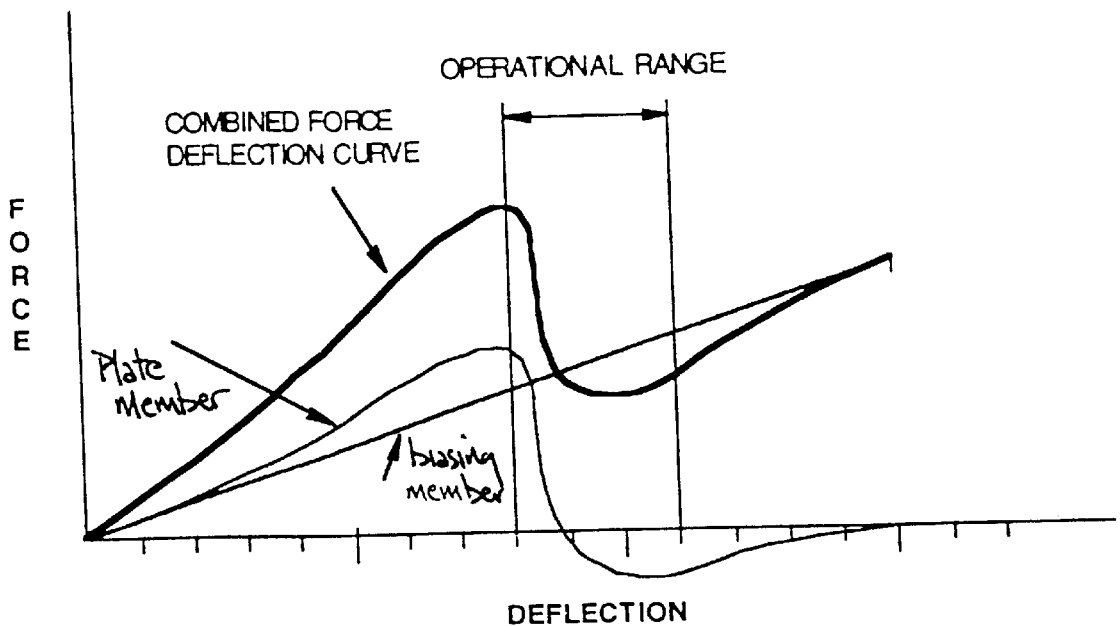
FIG. 3 is a force versus deflection chart, shown with the curves for the biasing member, the plate member, and a combination of the biasing member and the plate member of the pressure actuated clutch pulley of the invention.

The clutch pulley 10 of the preferred embodiment also includes a biasing member 54, which functions to bias the plate inner edge 36 of the plate member 24 in an axially outward direction. The biasing member 54 is preferably located between the sheave structural section 30 and the plate inner edge 36 of the plate member 24, but may alternatively be located in any suitable location adjacent the plate member 24. As shown in FIG. 3, the biasing member preferably functions to alter the force/deflection curve of the plate member. When using the plate member in the preferred operational range, a simple pressure increase or decrease within the cavity will cause axial movement of the plate inner edge. Preferably, the biasing member 54 is a coil spring 56, as shown in FIG. 2A. The biasing member 54, however, may include any suitable device, such as a wave spring 58 (as shown in FIG. 4), that alters the force/deflection curve of the plate member 24. The biasing member 54 is preferably made from conventional materials, such as steel, but may alternatively be made from other suitable materials.

The clutch 26 of the preferred embodiment functions to selectively rotationally engage the plate member 24 and the hub member 22 based on the axial position of the plate inner edge 36. In the preferred embodiment, the clutch 26 includes a hub friction disc 60 coupled to and extending radially outward from the hub output section 32, a support disc 62 coupled to the plate inner edge 36, and a clutch friction pad 64 mounted to the support disc 62. In alternative embodiments, the clutch 26 may include other suitable devices to selectively rotationally engage the plate member 24 and the hub member 22. Preferably, the hub friction disc 60 is integrally formed with the hub output section 32. Alternatively, the hub friction disc 60 may be separately formed and later attached to the hub output section 32 (as shown in FIG. 4). The hub friction disc 60 functions to provide an opposing surface 66 for the clutch friction pad. The hub friction disc 60 is preferably made from conventional structural materials, such as steel, but may alternatively be made from other suitable materials.

The support disc 62 of the clutch 26 of the preferred embodiment functions to provide a structural framework for the axial displacement of the clutch friction pad 64 against the hub friction disc 60 and to locate the clutch friction pad 64 at a suitable radial distance from the rotational axis of the clutch pulley 10. The support disc 62 is preferably made from conventional structural materials, such as hard plastic, but may alternatively be made from other suitable materials. Preferably, the plate inner edge 36 is crimped to the support disc 62. The plate inner edge 36 may alternatively be fastened to the support disc 62 with other suitable devices, such as bolts 44 (as shown in FIG. 4).

The clutch friction pad 64 of the clutch 26 of the preferred embodiment functions to selectively engage the hub friction disc 60. The clutch friction pad 64 is preferably mounted to the support disc 62 with suitable adhesives (not shown), but may alternatively be mounted to the support disc 62 with any suitable device or method. The clutch friction pad 64 is preferably made from conventional materials, such as cork or rubber, but may alternatively be made from other suitable materials.

The clutch pulley 10 of the preferred embodiment also includes a bearing member 68, which functions to allow relative rotational movement between the sheave member 20 and the output shaft 14. The bearing member 68 is preferably mounted between the sheave structural section 30 and the output shaft 14. The bearing member 68, which is a roller element type, preferably includes an outer race element 70 preferably press-fit mounted on the sheave structural section 30, an inner race element 72 preferably press-fit mounted on the output shaft 14, ball bearing elements 74 preferably located between the outer race element 70 and the inner race element 72, and bearing seals 76 preferably extending between the outer race element 70 and the inner race element 72 on either side of the ball bearing elements 74. The bearing member 68 may alternatively be of other suitable types, such as a journal bearing or a roller bearing, may alternatively include other suitable elements, and may alternatively be mounted in other suitable manners. Further, the clutch pulley 10 may include a second bearing member 78 (as shown in FIG. 4), or any number of bearing members, in any suitable location. The bearing member 68 is preferably a conventional device, but may alternatively be any suitable bearing device.

Unless otherwise noted, the parts of the clutch pulley 10 are preferably made with conventional methods, but may alternatively be made with other suitable methods.

As any person skilled in the art of pressure actuated clutch pulleys will recognize from the previous detailed description and from the figures and claims, modifications and changes can be made to the preferred embodiments of the invention without departing from the scope of this invention defined in the following claims.

I claim:

1. A pressure actuated clutch pulley for rotationally engaging an input device and an output shaft, comprising:
   a sheave member including a sheave input section adapted to engage the input device and a sheave structural section extending radially inward from said sheave input section;
   a hub member located substantially concentrically within said sheave member and including a hub output section adapted to engage the output shaft;
   a plate member including a plate outer edge mounted to said sheave input section and a plate inner edge located radially inward from said plate outer edge;
   said sheave member, said hub member, and said plate member cooperatively defining a cavity; said plate inner edge being selectively movable between a first axial position and a second axial position based upon a pressure within said cavity; and
   a clutch coupled between said plate inner edge and to said hub member and adapted to selectively rotationally engage said plate member and said hub member based upon the axial position of said plate inner edge.

2. The invention of claim 1 further comprising a bearing member mounted within said sheave structural section and adapted to be mounted on the output shaft and to allow relative rotational movement between said sheave member and the output shaft.

3. The invention of claim 1 further comprising a sheave seal fastened to said sheave structural section and adapted to substantially seal against the output shaft.

4. The invention of claim 1 wherein said plate outer edge is crimped to said sheave input section.

5. The invention of claim 1 wherein said clutch includes a clutch friction pad coupled to said plate member and a hub friction disk coupled to and extending radially outward from said hub output section; said clutch friction pad adapted to selectively contact said hub friction disk based upon the axial position of said plate inner edge.

6. The invention of claim 5 wherein said hub friction disk is integrally formed with said hub output section.

7. The invention of claim 5 wherein said clutch also includes a support disk; said plate inner edge being mounted to said support disk; and said clutch friction pad being mounted to said support disk.

8. The invention of claim 7 wherein said plate inner edge is crimped to said support disk.

9. The invention of claim 1 further comprising a plate seal fastened to said plate inner edge and adapted to substantially seal against said hub member.

10. A pressure actuated clutch pulley for rotationally engaging an input device and an output shaft, comprising:
    a sheave member including a sheave input section adapted to engage the input device and a sheave structural section extending radially inward from said sheave input section;
    a hub member located substantially concentrically within said sheave member and including a hub output section adapted to engage the output shaft and a hub friction disk extending radially outward from said hub output section;
    a plate member including a plate outer edge crimped to said sheave input section and a plate inner edge located radially inward from said plate outer edge; said sheave member, said hub member, and said plate member cooperatively defining a cavity; said plate inner edge being selectively movable between two axial positions based upon a pressure within said cavity; and
    a clutch friction pad coupled to said plate member and adapted to selectively contact said hub friction disk based upon the axial position of said plate inner edge.

11. The invention of claim 10 further comprising a bearing member mounted within said sheave structural section and adapted to be mounted on the output shaft and to allow relative rotational movement between said sheave member and the output shaft.

12. The invention of claim 10 further comprising a sheave seal fastened to said sheave structural section and adapted to substantially seal against the output shaft and a plate seal fastened to said plate inner edge and adapted to substantially seal against said hub member.

13. The invention of claim 10 wherein said hub member defines a port adapted to allow fluid flow between said cavity and a conduit within the output shaft.

14. The invention of claim 10 wherein said plate member is a bistable compliant mechanism having a first equilibrium with said plate inner edge in the first axial position and having a second equilibrium with said plate inner edge in the second axial position.

15. The invention of claim 10 comprising a support disk; said plate inner edge being crimped to said support disk; and said clutch friction pad being mounted to said support disk.

16. The invention of claim 10 further comprising a biasing member located between said sheave structural section and said plate member and adapted to bias said clutch friction pad to selectively rotationally engage said plate member and said hub member.

17. A pressure actuated clutch pulley for rotationally engaging an input device and an output shaft, comprising:
    a sheave member including a sheave input section adapted to engage the input device and a sheave structural section extending radially inward from said sheave input section;
    a hub member located substantially concentrically within said sheave member and including a hub output section adapted to engage the output shaft, wherein said hub member defines a port adapted to allow fluid flow between said cavity and a conduit within the output shaft;
    a plate member including a plate outer edge mounted to said sheave input section and a plate inner edge located radially inward from said plate outer edge; said sheave member, said hub member, and said plate member cooperatively defining a cavity; said plate inner edge being selectively movable between a first axial position and a second axial position based upon a pressure within said cavity; and
    a clutch coupled between said plate inner edge and said hub member and adapted to selectively rotationally engage said plate member and said hub member based upon the axial position of said plate inner edge.

18. A pressure actuated clutch pulley for rotationally engaging an input device and an output shaft, comprising:

a sheave member including a sheave input section adapted to engage the input device and a sheave structural section extending radially inward from said sheave input section;

a hub member located substantially concentrically within said sheave member and including a hub output section adapted to engage the output shaft;

a plate member including a plate outer edge mounted to said sheave input section and a plate inner edge located radially inward from said plate outer edge; said sheave member, said hub member, and said plate member cooperatively defining a cavity; said plate inner edge being selectively movable between a first axial position and a second axial position based upon a pressure within said cavity, and wherein said plate member is a bistable compliant mechanism having a first equilibrium with said plate inner edge in the first axial position and having a second equilibrium with said plate inner edge in the second axial position; and a clutch coupled between said plate inner edge and said hub member and adapted to selectively rotationally engage said plate member and said hub member based upon the axial position of said plate inner edge.

19. A pressure actuated clutch pulley for rotationally engaging an input device and an output shaft, comprising:

a sheave member including a sheave input section adapted to engage the input device and a sheave structural section extending radially inward from said sheave input section;

a hub member located substantially concentrically within said sheave member and including a hub output section adapted to engage the output shaft;

a plate member including a plate outer edge mounted to said sheave input section and a plate inner edge located radially inward from said plate outer edge; said sheave member, said hub member, and said plate member cooperatively defining a cavity; said plate inner edge being selectively movable between a first axial position and a second axial position based upon a pressure within said cavity;

a clutch coupled between said plate inner edge and to said hub member and adapted to selectively rotationally engage said plate member and said hub member based upon the axial position of said plate inner edge; and a biasing member located between said sheave structural section and said plate member and adapted to bias said clutch to selectively rotationally engage said plate member and said hub member.

20. The invention of claim 19 wherein said biasing member is a coil spring.

* * * * *

UNITED STATES PATENT AND TRADEMARK OFFICE
CERTIFICATE OF CORRECTION

PATENT NO. : 6,702,083 B2  Page 1 of 1
DATED : March 9, 2004
INVENTOR(S) : Richard Jacobson It is certified that error appears in the above-identified patent and that said Letters Patent is hereby corrected as shown below:

<u>Title page,</u>
Item [57], ABSTRACT,
Line 1, after "pulley" and before "rotationally" insert -- for --.
Line 13, after "axial" delete "position" and substitute -- positions -- in its place.

<u>Column 5,</u>
Line 33, after "edge and" delete "to".

<u>Column 8,</u>
Line 16, after "edge and" delete "to".

Signed and Sealed this

Fifteenth Day of June, 2004

JON W. DUDAS
*Acting Director of the United States Patent and Trademark Office*